United States Patent [19]

Schapira et al.

[11] Patent Number: 5,364,440
[45] Date of Patent: Nov. 15, 1994

[54] ANTI-CLUMPING PRODUCTS, COMPOSITIONS CONTAINING THE SAID PRODUCTS AND TREATMENTS IN WHICH THE SAID PRODUCTS ARE USED

[75] Inventors: Joseph Schapira, Paris; Jean-Claude Cheminaud, Herblay; Pascal Petitbon, Gennevilliers; Dominique Imbert, Courbevoie, all of France

[73] Assignee: C F P I, France

[21] Appl. No.: 24,250

[22] Filed: Mar. 1, 1993

[30] Foreign Application Priority Data

Feb. 28, 1992 [FR] France .................. 92 02409

[51] Int. Cl.⁵ .............................................. C05G 3/10
[52] U.S. Cl. .................. 71/64.12; 71/64.13; 106/213; 252/49.5
[58] Field of Search .............. 71/64.01, 64.07, 64.11, 71/64.13, 27, 64.12, 1, 11; 252/49.5; 106/213

[56] References Cited

U.S. PATENT DOCUMENTS

4,374,039 2/1983 Schapira et al. ............ 71/27
4,582,543 4/1986 Bretz ........................ 252/49.5

FOREIGN PATENT DOCUMENTS

0113687 1/1984 European Pat. Off. .
0341102 4/1989 European Pat. Off. .
1239004 10/1959 France .

*Primary Examiner*—Ferris Lander
*Attorney, Agent, or Firm*—Larson and Taylor

[57] ABSTRACT

Anti-clumping product for salts, simple and complex fertilizers as well as for nitrogenous derivatives, especially on the basis of ammonium nitrate, which might in particular be used in connection with explosives, consisting of a metallic salt of an acid phosphate ester having the general formulas I and II:

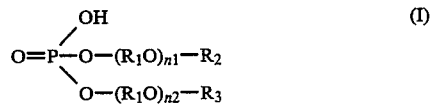

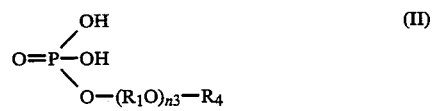

wherein:
  $R_1$ designates an alkylene group having from 2 to 4 carbon atoms,
  $R_1$, $R_2$ and $R_3$ designate each an alkyl group having from 2 to 24 carbon atoms, or an alkylaryl group whose alkyl part has from 1 to 18 carbon atoms, and
  $n_1$, $n_2$ and $n_3$ designate an integer from 0 to 15, the cation which is part of the constitution of the above-said metallic salt being a divalent or trivalent cation, especially one of those of the group comprising magnesium, calcium, aluminum, zinc and manganese, it being also possible to select the said cation from the group consisting of sodium and lithium.

12 Claims, 1 Drawing Sheet

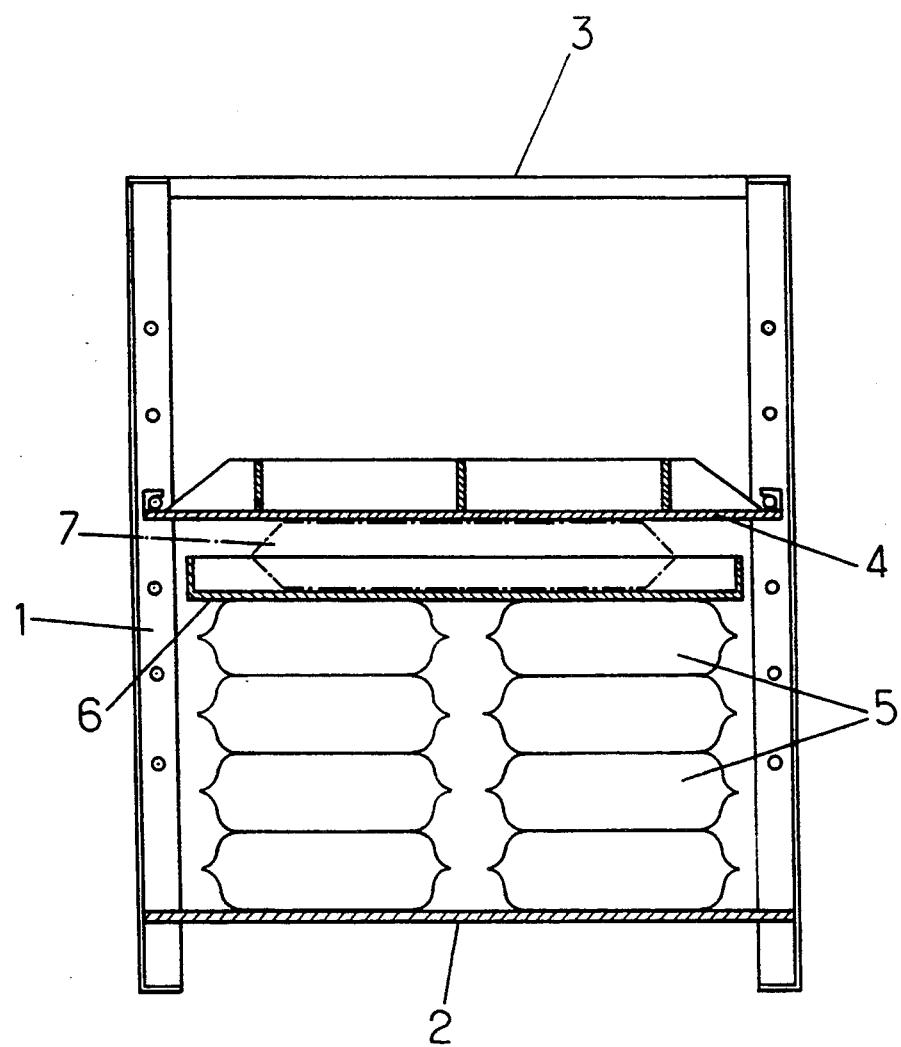

ANTI-CLUMPING PRODUCTS, COMPOSITIONS CONTAINING THE SAID PRODUCTS AND TREATMENTS IN WHICH THE SAID PRODUCTS ARE USED

The invention relates to anti-clumping products, i.e. products adapted to prevent the clumping of salts, simple and complex fertilizers as well as of nitrogenous derivatives, especially on the basis of ammonium nitrate which can in particular be used in connection with explosives.

The invention also relates to anti-clumping compositions containing the said anti-clumping products as well as to anti-clumping treatments in which the said products are used and finally the materials obtained by way of the said anti-clumping treatments.

Salts and simple fertilizers comprise the nitrogenous salts, especially mono- and diammonium sulphates as well as ammonium, potassium and calcium nitrates.

The said nitrates in question may be so-called industrial nitrates and so-called porous nitrates which are generally obtained by prilling or granulating; these nitrates may contain so-called "process additives" which contribute to the obtention of their final properties, for example hardness, humidity, porosity and fuel or oil absorption power; the said additives can be selected from the group comprising mineral salts such as aluminum sulphate and chemical organic compounds such as alkylarylsulphonates or alkylarylsulphonates polycondensed with formaldehyde; among the said chemical organic compounds a special mention is made to the compound marketed under the trademark GALORYL AT 725 by the Assignee, this product being essentially based on naphthalene sodium sulphonate polycondensed with formaldehyde.

Complex fertilizers are consisting of binary or ternary mixtures of the elements of the group consisting of nitrogen, phosphorus or potassium. These fertilizers are identified by formulas of the type Nx, Py, Kz wherein x, y, z represent numbers which respectively designate the percentages of nitrogen of phosphoric anhydride and of $K_2O$ within the mixture constituting the complex fertilizers.

The nitrogenous fertilizers based on urea comprise prilled or granulated ureas and the complex binary or ternary fertilizers in which the nitrogen is provided partially or totally by urea.

The complex fertilizers can also contain mineral oligo-elements comprising derivatives of magnesium, boron, manganese, this enumeration being not limiting; they also can contain organic elements of various origin, for example guano and wastes from leather.

It is well known that simple or complex salts granulated or prilled and, more generally, any one of the products which have just been enumerated show a significant tendency to clumping when stored.

This tendency to clumping is depending on numerous factors.

Some of these factors are related to or depending from the grain and others are not related to or depending from the grain.

Among the factors depending from the grain, there are:
the methods of manufacturing which can be selected from the group comprising prilling, granulating on drum, on dish or in fluidized bed, compacting, wherein the grain may adapt shapes and sizes which vary according to the process used,
the origin and the nature of the raw materials used,
the nature of the additives introduced during the method of manufacturing,
the residual humidity of the grain,
the physical features of the grain, for instance its porosity, its granulometry and its hardness,
the crystallographic features of the grain, for instance its structural polymorphism as far as ammonium nitrate is concerned,
certain chemical reactions which may continue even during storage.

Among the factors which are not related to the grain and which have an influence on the tendency to clumping, there are
the atmospheric humidity,
the temperature,
the pressure and the duration of storage,
the mechanical stress to which the grains are subjected during manutention and transportation; this stress may induce a degradation which would be in favour of clumping.

The clumping can reach proportions such that the fertilizer or the salt is no longer usable as such; in that case the recovery of the clumped product leads to such a high cost that it is inacceptable from the economical standpoint.

In order to prevent clumping of salts and fertilizers, it has already been proposed to use so-called anti-clumping products which may be of mineral or organic origin.

Among the mineral anti-clumping products already known, it is possible to mention clay, chalk and talc.

Among the organic anti-clumping products already known, it is possible to mention anionic and cationic surfactive agents in aqueous or oil formulation. The most frequently used cationic surfactive agents are consisting of fatty amines among which essentially stearylamine and hydrogenated tallow amines on the basis of stearylamine; the anionic surfactive agents comprise alkylarylsulphonares, certain derivatives of fatty acids and (EP-A-113 687) certain derivatives, i.e. the amine salts of acid phosphoric esters.

It has already been proposed to combine these anti-clumping products with polymers or with non-ionic surfactive agents.

However, theses products present the drawback consisting in the fact that they migrate to a certain extent within the material treated inducing in some cases a degradation of the grain which in turn may induce a loss of efficiency of the anti-clumping effect.

Taking into consideration the continuously increasing requirements of the users, the Applicants have continued their investigations and have had the merit of finding that it is possible to prevent the said migration phenomenons as well as the therefrom resulting drawbacks as soon as there are used certain metallic salts of esters of acid phosphate by which use it becomes possible to treat salts and fertilizers which tend to clump without using a mineral filler and to provide the material as treated not only with excellent anti-clumping properties but also with remarkable antidust characteristics, even during long storages at high temperature.

Consequently, the anti-clumping product according to the invention is consisting of a metallic salt of an acid phosphate ester having the general formulas I and II:

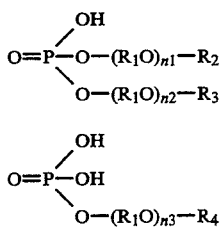

$$O=P\begin{matrix}OH\\O-(R_1O)_{n1}-R_2\\O-(R_1O)_{n2}-R_3\end{matrix} \quad (I)$$

$$O=P\begin{matrix}OH\\OH\\O-(R_1O)_{n3}-R_4\end{matrix} \quad (II)$$

wherein:
$R_1$ designates an alkylene group having from 2 to 4 carbon atoms, $R_1$, $R_2$ and $R_4$ designate each an alkyl group having from 2 to 24 carbon atoms, or an alkylaryl group whose alkyl part has from 1 to 18 carbon atoms, and $n_1$, $n_2$ and $n_3$ designate an integer from 0 to 15, the cation which is part of the constitution of the abovesaid metallic salt being a divalent or trivalent cation, especially one of those of the group comprising magnesium, calcium, aluminum, zinc and manganese, it being also possible to select the said cation from the group consisting of sodium and lithium.

The abovesaid acid phosphate esters can be prepared by direct action of phosphoric anhydrid with a compound having an hydroxyl group selected from the group comprising alcohols, alkylphenols, alkylnaphthols and polyols.

For economical reasons the most frequently used compounds comprising a hydroxyl group are consisting of the so-called technical products corresponding to mixtures.

The esterification reaction leads to mixtures of mono- and diesters, wherein the ratio mono/diester can vary.

In order to prepare metallic salts of the abovesaid acid phosphate esters, it is possible to react the metallic oxide or the hydroxide of the selected cation with the acid phosphate ester. In general, the reaction is carried out at high temperature, in particular from 80° to 100° C. Advantageously, the said reaction is carried out after a light dilution in a mineral oil.

It is not necessary that the totality of the hydroxyl functions of the acid phosphate ester is neutralized; preferably at least 40% of these functions are neutralized.

The anti-clumping composition according to the invention comprises besides the anti-clumping product,
at least one other anti-clumping product advantageously selected from the group comprising fatty acids and their salts,
a formulation agent advantageously selected from the group comprising oils and waxes, preferably from natural or synthetic origin.

Among the abovesaid fatty acids preferably are used those having from 12 to 20 carbon atoms and still more preferably stearic acid.

The salt of the fatty acid can be identical to that of the acid phosphate ester or different from this salt.

The abovesaid oils may be of vegetal origin but mineral oils are preferred for economical reasons.

Mineral paraffinic or naphthalic oils can be used for instance paraffinic basis oils whose features are as follows:

| | |
|---|---|
| volumic mass at 15° C. | 875 kg/m$^3$ |
| cinematic viscosity at 40° C. | 20 mm$^2$/s. |

Many companies from the mineral oil industry market have these features; for instance, there may be mentioned the oil 100 S marketed by the Company TOTAL, the oil marketed under the trademark ENERPAR 10 by the Company B.P.; is also possible to mention oils having a more naphthenic character such as that which is marketed under the trademark NYTEX 810 by the Company NYNAS.

It is also possible to select more visquous oils (cinematic viscosity at 40° C., 475 mm$^2$/s) like that which is marketed under the trademark PROREX 25 by the Company MOBIL.

Among the waxes, it is possible to select a paraffin wax having the following characteristics:

| | |
|---|---|
| melting point | 55 to 80° C. |
| cinematic viscosity at 100° C. | 8 to 25 mm$^2$/s. |

The proportions of the various constituents within the compositions according to the invention appear from Table I.

TABLE I

| Constituent | Percentage by weight of the formulation | Preferred percentage |
|---|---|---|
| Metallic salt of the acid phosphate ester | 2–50 | 4–15 |
| Fatty acid or one of its salts | 0–15 | 0–10 |
| Mineral oil | 0–98 | 35–80 |
| Paraffinic wax | 0–98 | 20–65 |

The anti-clumping treatment according to the invention is characterized by the fact that an efficient amount of the anti-clumping composition according to the invention is incorporated to the product which is to be subjected to the anti-clumping treatment.

The abovesaid efficient amount is from 0.01 to 0.5% by weight with respect to the product to be treated and advantageously comprised between 0.05 and 0.25%.

The incorporation is generally carried out at the moment at which the salt or fertilizer has acquired almost the totality of its final physical and mechanical properties; the said incorporation may be carried out by spraying at a temperature of about 80° C. by way of an adapted system enabling a homogeneous repartition on the treated product.

Practically speaking, the incorporation is generally carried out within coating drums located after the cooling device of the installation for the manufacture of the product to be subjected to an anti-clumping treatment. The temperature of the product in question is generally below 40° C. The humidity of the said product is generally at that step lower than 1%. In certain particular cases the said product, i.e. the salt or the fertilizer, may be at a temperature between 40° and 80° C., the complementary cooling being carried out after applying the anti-clumping composition.

It is always possible to add a mineral coating agent before or after applying the anti-clumping composition, but one of the essential features of the anti-clumping products according to the invention is consisting in the fact that they advantageously allow the suppression of the said coating products with as consequence the elimination of the dust which could occur from said coating products.

The invention will even still be better understood by way of the non-limiting examples which follow and wherein advantages and embodiments of the invention are disclosed more especially in comparison with the prior art.

In order to illustrate the properties of the anti-clumping products according to the invention, the salts or fertilizers which have been treated in these examples, are then filled in polyethylene bags; these bags are then stacked within a device adapted to characterize clumping of a given product, said device being shown at the single drawing.

BRIEF DESCRIPTION OF DRAWINGS

The single FIGURE shows a device in which bags filled with fertilizer are stacked so as to characterize clumping of a given product.

As shown on the said single drawing, the device comprises a metallic structure consisting of posts 1, a loading pallet 2, distance pieces 3 and a fixed pallet 4.

Polyethylene bags 5 filled with the product to be tested (salt or fertilizer treated with the product according to the invention), are stacked as shown on the pallet 2.

A pallet 6 carrying a lifting cushion 7 is put on the stack of bags. When inflating the cushion with compressed air between the mobile pallet 6 and the fixed pallet 4, a pressure is transmitted to the stack of bags.

This pressure can be modified and can simulate a stack of bags having a height of 12 m.

The fertilizer is maintained under pressure during a duration which is variable, generally from 10 to 45 days, sometimes during several months. At the end of the test, the bags are opened. The clumps are weighed and the hardness of the clumps is determined using a dynamometer.

The clumping is expressed in percentage of clumps (between 0 and 100).

The hardness of the clumps is generally comprised between 0 and 100N; it can reach a value of 300N in the case of the non-treated references.

The result is characterized by what is called the clumping index, this index being the result of the multiplication of the percentage of clumps with the hardness of the said clumps.

Each recorded result corresponds to the average value of the results determined with several bags in general 4).

In the following examples, fertilizers or salts which are known for the difficulty which occurs when trying to prevent them from clumping have been treated.

EXAMPLE 1

Various anti-clumping treatments different from one another are applied to a granulated complex fertilizer whose formula is 3×17.

In order to obtain first of all the anti-clumping product, 15.8 parts by weight of phosphoric anhydride whose formula is $P_2O_6$ are reacted with 84.2 parts by weight of a mixture of linear fatty alcohols, whose alkyl part is principally consisting for 63% in $C_{16}$ and for 33% in $C_{18}$, obtaining thus 50% of monoester and 50% of diester.

This compound is called product A.

80% of the free hydroxyl functions of product A are then neutralized in the form of magnesium salt by reacting 10 parts by weight of product A with 0.54 part by weight of magnesium oxide.

The thus obtained product is called product B.

Starting from product B there are prepared three anti-clumping compositions whose constituent elements and proportions are recorded in Table II.

TABLE II

| Constituents | Proportions (% by weight) | | |
|---|---|---|---|
| | Composition 1 | Composition 2 | Composition 3 |
| Product B | 10 | 10 | 10 |
| Magnesium stearate | 10 | 10 | |
| Paraffinic mineral oil Cinematic viscosity 20 mm²/s at 40° C. | 50 | 30 | 50 |
| Paraffinic wax Melting point 75° C. | 30 | 50 | 40 |
| | 100 | 100 | 100 |

Compositions 1 to 3 are used at a rate of 0.2% by weight with respect to the treated fertilizer.

The compositions are sprayed at 80° C. over a fertilizer whose temperature is 28° C.

The thus treated fertilizer is then packaged in polyethylene bags which are stacked and stored in clumping devices of the kind disclosed by the drawing.

The duration of the storage within the said device is 30 days at 25° C. under a pressure of 0.8 kg/cm²;

Bags filled with the same fertilizer which is not subjected to any anti-clumping treatment are subjected to the same conditions.

At the end of the storage, the bags are opened carefully and the clumping index is calculated according to the method hereabove disclosed.

The results obtained are recorded in the following Table III.

TABLE III

| | Treatment with | | | |
|---|---|---|---|---|
| | Composition 1 | Composition 2 | Composition 3 | Non-treated fertilizer |
| Clumping (in %) | 60 | 50 | 50 | 100 |
| Hardness of the clumps (N) | 60 | 72 | 56 | 300 |
| Clumping index | 3600 | 3600 | 2800 | 30000 |

The efficiency of the compositions according to the invention clearly appears from the results recorded in Table III.

EXAMPLE 2

Various anti-clumping treatments different from one another are used with respect to a granulated complex fertilizer having the formula 15.12.24.

In this example, the superiority of the anti-clumping compositions according to the invention with respect to anti-clumping products according to the prior art used with a mineral coating agent is demonstrated.

In order to prepare the anti-clumping products according to the invention, 50% of the free hydroxyl functions of product A obtained at Example I are neutralized by reacting 9 parts by weight of product A with 1 part by weight of aluminum isopropylate are used.

The thus obtained aluminum salt is denoted product C.

Two anti-clumping compositions according to the invention are prepared and the proportions as well as the nature of the constituent elements of the said compositions are recorded in Table IV (composition 2 is identical to composition 2 of example 1).

TABLE IV

|  | Proportions (in %) | |
| --- | --- | --- |
|  | Composition 2 | Composition 4 |
| Product B | 10 |  |
| Product C |  | 10 |
| Magnesium stearate | 10 |  |
| Aluminum stearate |  | 3 |
| Paraffinic mineral oil Cinematic viscosity 20 mm$^2$/s at 40° C. | 30 | 45 |
| Paraffinic wax Melting point 75° C. | 50 | 42 |
|  | 100 | 100 |

Compositions 2 and 4 are applied on the said complex fertilizer in an amount corresponding to 0.2% by weight.

The same complex fertilizer is subjected for seek of comparison to an anti-clumping treatment using two anti-clumping "systems" according to the prior art which are called "System 1" and "System 2", i.e.:

System 1

An amount of 0.6% by weight with respect to the fertilizer of a commercial mineral amine filler containing 3% of stearylamine is applied to the fertilizer and then 0.25% by weight with respect to the fertilizer of a paraffinic waxy fraction are sprayed on the fertilizer.

System 2

0.3% by weight of talc with respect to the fertilizer are applied on the latter and then 0.2% by weight of a commercial amine oil with respect to the fertilizer are sprayed on the latter.

In both cases, the fertilizer thus treated has a temperature of 28° C.; the mineral fillers are dusted on the fertilizer and then the oily formulations whose temperature is equal to 80° C. are sprayed on the said fertilizer.

The thus treated fertilizer is subjected to the test disclosed in example 1 and the same determinations as in example 1 are carried out. The duration of the test is 20 days. The pressure is 0.8 kg/cm$^2$ and the temperature is 25° C.

The results obtained with compositions 2 and 4 as well as the systems 1 and 2 are recorded in Table V.

TABLE V

|  | Composition or system used | | | | Non-treated fertilizer |
| --- | --- | --- | --- | --- | --- |
|  | Composition 1 | Composition 2 | System 1 | System 2 |  |
| Amount used (%) | 0.2 | 0.2 | 0.6 +0.25 | 0.3 +0.2 |  |
| Clumping (%) | 40 | 40 | 50 | 50 | 100 |
| Hardness of the clumps (N) | 50 | 52 | 68 | 72 | 300 |
| Clumping index | 2000 | 2080 | 3400 | 3600 | 30000 |

From the examination of the results recorded in Table V, it appears that, when using the compositions according to the invention, there is obtained an anti-clumping effect higher than the effect obtained when using the prior art products with a mineral coating agent.

Due to the invention, it is consequently possible to suppress the use of a mineral coating agent.

EXAMPLE 3

Various anti-clumping treatments different from one another are applied by spraying at 80° C. on an ammonium nitrate having a content equal to 33.5% of nitrogen, the temperature of the same ammonium nitrate being 25° C.

The abovesaid ammonium nitrate is obtained by way of prilling of the nitrate proper and then by "increasing" by use of a suspension of ammonium nitrate and of clay in order to apply 43 kg of clay to each ton of ammonium nitrate.

The said ammonium nitrate is treated with an amount corresponding to 0.08% by weight with respect to the fertilizer of the compositions 2 and 4 hereabove disclosed in examples 1 and 2 and with a composition 5 prepared starting from product C disclosed in example 2, the nature and proportions of the constituents of composition 5 being recorded in Table VI.

TABLE VI

| Nature of the constituents | Composition 5 (% by weight) |
| --- | --- |
| Product C | 7 |
| Aluminum stearate | 3 |
| Paraffinic mineral oil Cinematic viscosity 20 mm$^2$/s at 40° C. | 45 |
| Paraffinic wax Melting point 75° C. | 45 |

The treated fertilizer is then packed in polyethylene bags which are stacked within the device described with reference to the single drawing.

The duration of the test is 15 days at normal temperature the pressure being 1.2 kg/cm$^2$.

The results are collected in Table VII hereafter indicated.

TABLE VII

|  | Treatment with | | | Non-treated control |
| --- | --- | --- | --- | --- |
|  | Composition 2 | Composition 4 | Composition 5 |  |
| Clumping (%) | 40 | 38 | 42 | 100 |
| Hardness of the clumps (N) | 45 | 40 | 45 | 300 |
| Clumping index | 1800 | 1520 | 1890 | 30000 |

The efficiency of the compositions according to the invention clearly appears from the results recorded in Table VII.

EXAMPLE 4

Various anti-clumping treatments different from one another are applied to a granulated complex fertilizer corresponding to the formula 3×17.

10 g of the acid phosphoric ester (product A) of example 1 are reacted with 1.3 g of zinc carbonate whose zinc content expressed as ZnO is of about 71%, the temperature being 100° C. and the duration of the reaction 3 hours (neutralization of 70% of the free hydroxyl functions).

The thus obtained product is called product E.

Products respectively denoted F, G, H, K and L are prepared by reacting respectively 0.4 g, 0.65 g, 0.84 g, 0.9 g and 0.48 g of magnesium oxide with respectively 10 g of each of the acid phosphate esters obtained under the form of mixtures of mono- and diesters comprising 50% of diesters starting from the following alcohols: fatty alcohol $C_{12}$–$C_{14}$ with 3 ethylene oxide moles (product F), fatty alcohol $C_{12}$-$C_{14}$ (product G), linear alcohols in $C_8$-$C_{10}$ (product H), ethyl-2-hexanol (product K) and nonylphenol with 1.5 mole of ethylene oxide (product L), thus neutralizing 80% of the free hydroxyl functions.

Starting from the products E to L, there are prepared the corresponding compositions 6 to 11. The nature and the proportions of the constituents of the compositions 6 to 11 are given in Table VIII.

TABLE VIII

| Nature of the constituent | Proportion (in %) | | | | | |
|---|---|---|---|---|---|---|
| | Composition 6 | Composition 7 | Composition 8 | Composition 9 | Composition 10 | Composition 11 |
| Product E | 10 | | | | | |
| Product F | | 10 | | | | |
| Product G | | | 10 | | | |
| Product H | | | | 10 | | |
| Product K | | | | | 10 | |
| Product L | | | | | | 10 |
| Magnesium stearate | 10 | 10 | 10 | 10 | 10 | 10 |
| Paraffinic mineral oil (cinematic viscosity 20 mm²/s at 40° C.) | 50 | 50 | 50 | 50 | 50 | 50 |
| Paraffinic wax Melting point 75° C. | 30 | 30 | 30 | 30 | 30 | 30 |

The anti-clumping treatment is consisting in spraying on the fertilizer whose temperature is 28° C. the anti-clumping compositions 6 to 11 as well as composition 1 of example 1, their temperature being 80° C.

Then the procedure is as indicated in example 1. The duration of the stacking is 15 days at 28° C. The results are indicated in Table IX.

TABLE IX

| | Composition 1 | Composition 6 | Composition 7 | Composition 8 | Composition 9 | Composition 10 | Composition 11 | Non-treated control |
|---|---|---|---|---|---|---|---|---|
| Clumping (%) | 40 | 35 | 55 | 60 | 55 | 52 | 65 | 100 |
| Hardness of the clumps (N) | 50 | 52 | 60 | 58 | 60 | 545 | 65 | 300 |
| Clumping index | 2000 | 1820 | 3300 | 3480 | 3300 | 2808 | 4225 | 30000 |

From the examination of Table IX, it appears that the metallic salts of numerous acid phosphate esters permit to obtain very good results.

EXAMPLE 5

Various anti-clumping treatments different from one another are applied on an industrial porous prilled ammonium nitrate intended to the manufacture of explosives. This ammonium nitrate contains an adjuvant called "of process" of the sodium naphthalene sulphonate type polycondensated with formaldehyde, marketed by the assignee under the trademark GALORYL AT 725.

The ammonium nitrate is subjected to a treatment which comprises applying 0.1% of the anti-clumping composition 4 defined in Example 2, the temperature being 80° C.

The thus treated ammonium nitrate is packed in polyethylene bags and is then subjected to a clumping test in a device corresponding to that shown in the single drawing.

The duration of the stacking is 15 days under a pressure of 0.4 kg/cm².

At the end of this test the clumps are weighed and their hardnesses are determined using a dynamometer.

The experience is repeated using a product according to the prior art, i.e. a commercial oil on the basis of an amine at a rate of 0.1% by weight with respect to the ammonium nitrate.

The results obtained are recorded in Table X.

TABLE X

| Nature of the treatment | Clumping (in %) | Hardness of the clumps (N) | Clumping index |
|---|---|---|---|
| Composition 4 | 50 | 62 | 3100 |
| Commercial oil on the basis of amine | 60 | 72 | 4320 |
| (prior art) Non-treated control | 100 | 220 | 22000 |

From the examination of the results recorded in the above-mentioned Table, it appears that the products according to the invention show anti-clumping performances which are higher than those of the product according to the prior art (oil on the basis of amine).

We claim:

1. Anti-clumping composition for salts, simple and complex fertilizers as well as for nitrogenous derivatives on the basis of ammonium nitrate an adapted to be used in connection with explosives, comprising from 2–50% by weight of the composition of a metallic salt of an acid phosphate ester having the general formulas I and II:

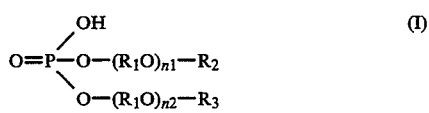

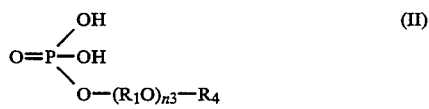

wherein:

$R_1$ designates an alkylene group having from 2 to 4 carbon atoms, $R_1$, $R_2$ and $R_3$ designate each an alkyl group having from 2 to 24 carbon atoms, or an alkylaryl group whose alkyl part has from 1 to 18 carbon atoms, and n₁, n₂ and n₃ designate an integer from 0 to 15, the cation which is part of the constitution of the above-said metallic salt being selected from the divalent cations selected from the group consisting of magnesium, copper, zinc and manganese, from the trivalent cations consisting of aluminum and from monovalent cations selected from the group consisting of sodium and lithium, 0–15% by weight of at least one other anti-clumping product selected from the group consisting of fatty acids and their salts, and the balance a formulation agent selected from the group consisting of oils and waxes from natural or synthetic origin and mixtures thereof.

2. Anti-clumping composition according to claim 1, wherein at least 40% of the hydroxyl functions of the acid phosphate ester are neutralized.

3. Anti-clumping composition according to claim 1, wherein the fatty acid has from 12 to 20 carbon atoms.

4. Anti-clumping composition according to claim 1, wherein the fatty acid is stearic acid.

5. Anti-clumping composition according to claim 1, comprising an oil of vegetal origin.

6. Anti-clumping composition according to claim 1, comprising a mineral oil selected from the paraffinic and naphthenic oils.

7. Anti-clumping composition according to claim 1, comprising a paraffinic oil whose features are as follows:

| | |
|---|---|
| volumic mass at 15° C. | 875 kg/m³ |
| cinematic viscosity at 40° C. | 20 mm²/s. |

8. Anti-clumping composition according to claim 1, comprising a paraffin wax having the following characteristics:

| | |
|---|---|
| melting point | 55 to 80° C. |
| cinematic viscosity at 100° C. | 8 to 25 mm²/s. |

9. Anti-clumping composition according to claim 1, comprising:

from 4 to 35% by weight of metallic salt of the acid phosphate ester having the general formulas (I) and (II), from 0 to 10% by weight of fatty acid or one of its salts, from 35 to 80% by weight of mineral oil and from 20 to 65% by weight of a paraffinic wax.

10. Anti-clumping treatment for salts, simple and complex fertilizers, nitrogenous derivatives on the basis of ammonium nitrate and explosives, wherein an efficient amount of the anti-clumping composition according to claim 1 is incorporated to the said product.

11. Anti-clumping treatment according to claim 10, wherein the effective amount is from 0.01 to 0.5% by weight with respect to the product to be treated.

12. Anti-clumping treatment according to claim 10, wherein the effective amount is from 0.05 to 0.25% by weight with respect to the product to be treated.

* * * * *